United States Patent
Robinson (10) Patent No.: US 12,368,680 B2
(45) Date of Patent: Jul. 22, 2025

(54) VIRTUAL CHANNEL BUFFER BYPASS

(71) Applicant: Graphcore Limited, Bristol (GB)

(72) Inventor: Ashley Robinson, Bristol (GB)

(73) Assignee: GRAPHCORE LIMITED, Bristol (GB)

(*) Notice: Subject to any disclaimer, the term of this patent is extended or adjusted under 35 U.S.C. 154(b) by 88 days.

(21) Appl. No.: 18/505,478

(22) Filed: Nov. 9, 2023

(65) Prior Publication Data

US 2024/0163222 A1    May 16, 2024

(30) Foreign Application Priority Data

Nov. 10, 2022  (GB) ...................................... 2216786

(51) Int. Cl.
| | |
|---|---|
| *G06F 15/173* | (2006.01) |
| *H04L 47/62* | (2022.01) |
| *H04L 49/00* | (2022.01) |
| *H04L 49/109* | (2022.01) |

(52) U.S. Cl.
CPC ........ *H04L 47/6205* (2013.01); *H04L 49/109* (2013.01); *H04L 49/3018* (2013.01)

(58) Field of Classification Search
CPC ............... H04L 47/6205; H04L 49/109; H04L 49/3018
See application file for complete search history.

(56) References Cited

U.S. PATENT DOCUMENTS

| | | |
|---|---|---|
| 2018/0081838 A1 | 3/2018 | Hanscom |
| 2018/0159786 A1* | 6/2018 | Rowlands ............. H04L 49/109 |

OTHER PUBLICATIONS

Search Report dated May 18, 2023 for United Kingdom Patent Application No. GB2216786.0.

* cited by examiner

*Primary Examiner* — Joseph R Maniwang
(74) *Attorney, Agent, or Firm* — HAYNES AND BOONE, LLP (57) ABSTRACT

A bypass path is provided in the node for reducing the latency and power consumption associated with writing to and reading from the VC buffer, and is enabled when certain conditions are met. Bypass is enabled for a received packet when there is no other data that is ready to be sent from the VC buffer, which is the case when all VCs either have zero credits or an empty partition in the buffer. In this way, data arriving at the node is prevented from using the bypass path to take priority over data already held in the VC buffer and ready for transmission.

19 Claims, 10 Drawing Sheets

VIRTUAL CHANNEL BUFFER BYPASS

CROSS-REFERENCE TO RELATED APPLICATIONS

The present application claims priority to United Kingdom Patent Application No. GB2216786.0, filed Nov. 10, 2022, the disclosure of which is hereby incorporated herein by reference in its entirety.

TECHNICAL FIELD

The present disclosure relates to a node forming part of an interconnect and, in particular to a node for buffering and forwarding data packets that each associated with one of a plurality of virtual channels.

BACKGROUND

In order to exchange data between multiple components, an interconnect may be provided, where that interconnect comprises a plurality of nodes for routing packets between those components. In the case that the components are provided together on a single integrated circuit (i.e. a chip), such an interconnect is referred to as a network on chip (NoC). Packets are output from a sending component attached to a node of the interconnect and passed along the interconnect from node to node, until reaching a node to which a destination component is attached. At that node, the packets are output to that destination component.

SUMMARY

One issue that may be presented when transferring packets along an interconnect is head of line blocking (HOL blocking) in which, when a number of packets are buffered at a particular node of the interconnect, one of the packets at the front of the queue holds up the sending of the remaining packets. One way of addressing this is to provide a plurality of virtual channels (VCs) in the interconnect, where each virtual channel is associated with a particular component attached to the interconnect and is used for the routing of data packets to that component. Each node, when deciding which of a set of buffered packets to forward to the next node of the interconnect, arbitrates between the different virtual channels so as to provide for fairness between sending to different destinations.

Another issue that may be presented when transferring packets along an interconnect is latency. When a packet is received at a node, that packet is written to the buffer. One or more clock cycles later, that packet is read from the buffer, and output from the node to the next node of the interconnect. Completing all of these steps typically requires several clock cycles. It is desirable to reduce the number of clock cycles required, so as to reduce the latency of transmission along the interconnect. It is also desirable to reduce the power consumption associated with writing to and reading from the buffer.

According to a first aspect, there is provided a first node of an interconnect, wherein the first node comprises: an ingress interface configured to receive a plurality of data packets from a second node of the interconnect, wherein each of the plurality of data packets is associated with one of a plurality of virtual channels; a buffer configured to store a subset of the plurality of data packets; wiring providing a path from the ingress interface to the egress interface, wherein the path bypasses the buffer; an egress interface configured to output the plurality of data packets to a third node of the interconnect; a credit store configured to store credits, each of the credits being associated with one of the plurality of virtual channels and granting permission for sending to the third node, one of the plurality of data packets that is associated with the respective one of the plurality of virtual channels; and circuitry configured to: forward the subset of the plurality of data packets from the buffer over the egress interface for delivery to the third node; upon receipt of a first packet of the plurality of data packets, forward the first packet via the path for output over the egress interface in response to determining that for each of the virtual channels, at least one of the following conditions is met: there are zero credits associated with the respective virtual channel in the credit store; and there are no data packets associated with the respective virtual channel that are held in the buffer and pending transmission to the third node.

A bypass path is provided in the node for reducing the latency and power consumption associated with writing to and reading from the VC buffer, and is enabled when certain conditions are met. Bypass is enabled for a received packet when there is no other data that is ready to be sent from the VC buffer, which is the case when all VCs either have zero credits or an empty partition in the buffer. In this way, data arriving at the node is prevented from using the bypass path to take priority over data already held in the VC buffer and ready for transmission.

According to a second aspect, a method implemented in a first node of an interconnect, wherein the method comprises: storing credits in a credit store, each of the credits being associated with one of a plurality of virtual channels and granting permission for sending to a third node of the interconnect, one of a plurality of data packets that is associated with the respective one of the plurality of virtual channels; receiving at an ingress interface, the plurality of data packets from a second node of the interconnect, wherein each of the plurality of data packets is associated with one of the plurality of virtual channels; storing a subset of the plurality of data packets in a buffer; forwarding the subset of the plurality of data packets from the buffer over an egress interface of the first node for delivery to the third node; upon receipt of a first packet of the plurality of data packets, forwarding the first packet via a path that bypasses the buffer for output over the egress interface in response to determining that for each of the virtual channels, at least one of the following conditions is met: there are zero credits associated with the respective virtual channel in the credit store; and there are no data packets associated with the respective virtual channel that are held in the buffer and pending transmission to the third node.

According to a third aspect, there is provided a computer program comprising a set of computer readable instructions which, when executed by at least one processor of a first node of an interconnect, cause a method to be performed, wherein the method comprises: storing credits in a credit store, each of the credits being associated with one of a plurality of virtual channels and granting permission for sending to a third node of the interconnect, one of a plurality of data packets that is associated with the respective one of the plurality of virtual channels; storing a subset of the plurality of data packets in a buffer; forwarding the subset of the plurality of data packets from the buffer over an egress interface of the first node for delivery to the third node; and upon receipt of a first packet of the plurality of data packets at the first node, forwarding the first packet via a path that bypasses the buffer for output over the egress interface in response to determining that for each of the virtual channels, at least one of the following conditions is met: there are zero credits associated with the respective virtual channel in the credit store; and there are no data packets associated with the respective virtual channel that are held in the buffer and pending transmission to the third node.

According to a fourth aspect, there is provided a non-transitory computer readable medium storing a computer program according to the third aspect.

BRIEF DESCRIPTION OF DRAWINGS

To assist understanding of the present disclosure and to show how embodiments may be put into effect, reference is made by way of example to the accompanying drawings in which.

DETAILED DESCRIPTION

Embodiments are implemented in a node forming part of an interconnect for exchanging data between components. This interconnect may be implemented on a single chip and take the form of a network on chip (NoC).

Figure 1:
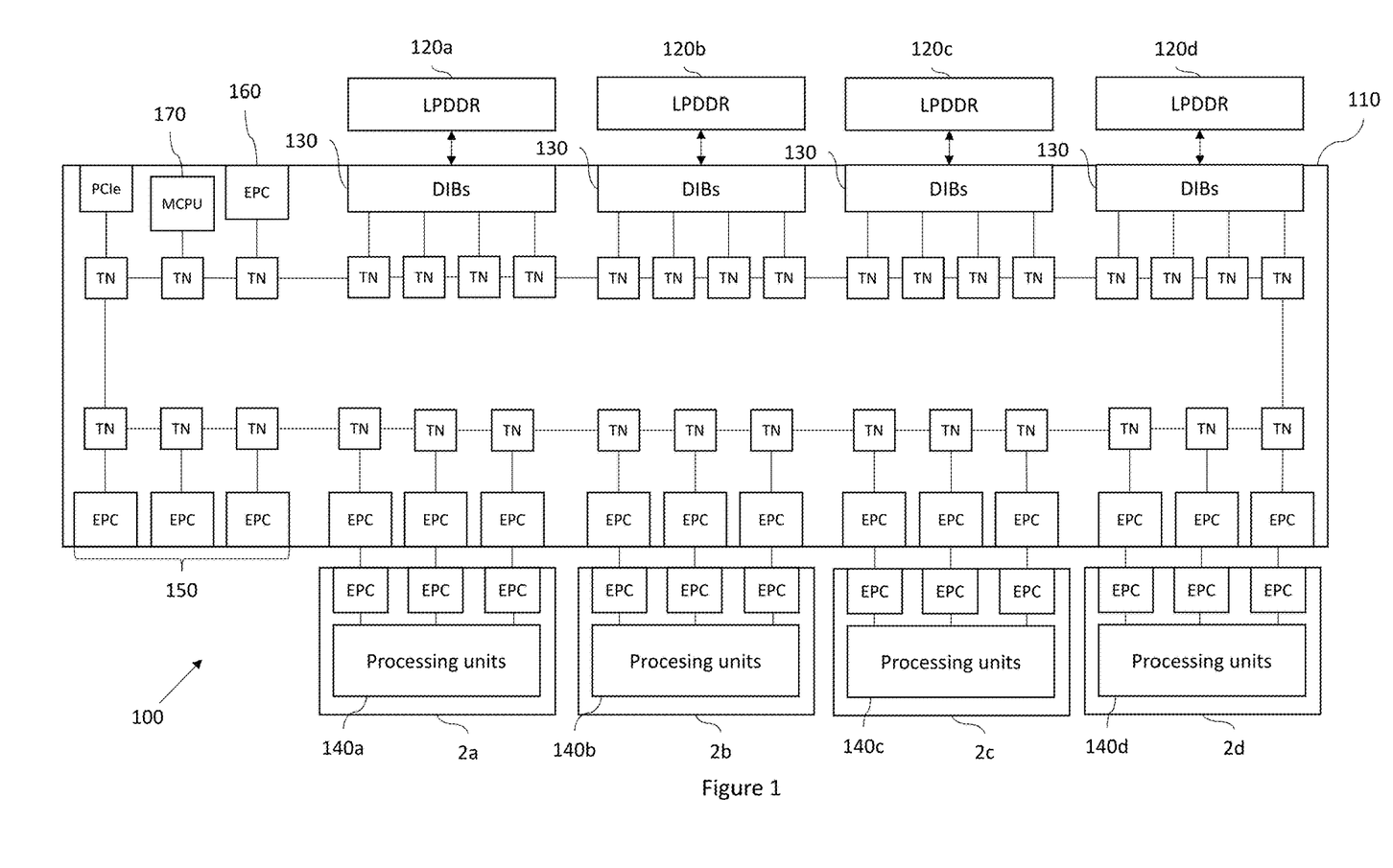
FIG. 1 illustrates a system including a fabric chip including an interconnect comprising a plurality of nodes.

Reference is made to FIG. 1, which illustrates an example of a system 100 according to example embodiments. The system 100 comprises processor chips 2a-d, each including one of the processing units 140a-d. Each of the processing units 140a-d may take the form of a multi-tile processing unit, an example of which is described in U.S. patent application Ser. No. 16/276,834, which is incorporated by reference.

The system 100 also comprises a further chip 110, which is referred to herein as the fabric chip 110. The fabric chip 110 enables communication between the processing units 140a-d and other devices in the system 100. In particular, the fabric chip 110 enables processing units 140a-d to access memory of memory devices 120a-d, to communicate with a host system via a PCIe interface, to communicate with one another, and to communicate with further processing units.

The fabric chip 110 includes a number of interface controllers for communication with other chips (i.e. processor chips 2a-d or other instances of the fabric chip 110). These are shown in FIG. 1 as EPCs ('Ethernet Port Controllers') and provide for the dispatch of packets between processor chips 2a-d in Ethernet frames. Each of the chips 2a-d also includes such interface controllers for communicating with the fabric chip 110. As shown, each chip 2a-d has multiple interface controllers for communicating with the fabric chip 110, permitting multiple tiles 4 of a processing unit 140a-d to send or receive data with the fabric chip 110 at the same time. In addition to the EPCs for communicating with the attached processor chips 2a-d, the fabric chip 110 further comprises a set of EPCs 150 for communicating with other fabric chips within a group (a 'POD') of processor chips, and an EPC 160 for connection to external Ethernet switches of an Ethernet network, enabling different groups of processor chips to communicate in a further scaled system.

The fabric chip 110 comprises a network on chip (NOC) for transferring packets between the different interfaces of the chip 110. In embodiments, the NOC is a circular interconnect comprising a plurality of interconnected nodes, which are referred to herein as "trunk nodes" and labelled 'TN' in FIG. 1. Packets traverse the interconnect, by passing from one trunk node to the next, where they are subject to arbitration and routing at each trunk node.

FIG. 1 shows a number of memory devices 120a-d connected to the fabric chip 110. In the example embodiment shown in FIG. 1, each of the memory devices 120a-d comprises Low-Power Double Data Rate (LPDDR) memory. However, a different type of memory could be used. In the example embodiment shown in FIG. 1, the fabric chip 110 comprises a plurality of memory controllers 130—shown as DIBs (DDR interface bridges)—which provide an interface between the trunk nodes and the LPDDR memory. The memory controllers 130 provide interfaces to the memory devices 120a-d, enabling the processing units 140a-d to access the memory devices 120a-d. The memory controllers 130 receive memory read and write request packets originating from the processing units 140a-d, where those requests are to read or write from the memory of the associated memory devices 120a-d. In response to read requests, the memory controllers 130 return read completions containing the requested data.

The fabric chip 110 also comprises a management processor 170 (shown as the MCPU 170) for running software for supporting the execution of application software by processing units 140a-d. The MCPU 170 may send and receive data packets with other components belonging to the fabric chip 110 in order to perform various management functions. For example, the MCPU 170 may send packets to EPC 160 to set up connection state and to provide frames for test traffic.

As noted above, the fabric chip 110 comprises an interconnect comprising a plurality of trunk nodes between which the packets are routed. Each of the trunk nodes is attached to a component of the fabric chip 110 from which it can receive data packets for dispatch to another component of the chip 110 or to which it can output data packets originating from another component. When providing data packets to its attached trunk node to be routed on the interconnect, a component is referred to as the "source component" for those data packets. On the other hand, when receiving data packets from its attached trunk node that have been routed on the interconnect, a component is referred to as the "destination component" for those data packets.

Components on the chip 110 to which the trunk nodes may output data packets and from which the trunk nodes may receive data packets include the EPCs that interface with the chips 2a-d, the EPCs 150 that interface with other fabric chips, the EPC 160 for interfacing with the Ethernet network switches, the DIBs 130 for interfacing with the memory devices 120a-d, the MCPU 170, and the PCIe interface for interfacing with the host. In addition to the trunk nodes, the interconnect may also include further nodes (not shown in FIG. 1)—referred to as trunk extension units—which receive packets from a node of the interconnect, buffer those packets, and output the packets to the next node of the interconnect, but do not have an attached component that may acts as a source or destination component for the packets.

As is seen in FIG. 1, the interconnect forms a ring on the fabric chip 110. Packets may be transmitted in either direction around the ring. When a packet is received at a trunk node from a source component, the direction in which the packet is transmitted is dependent upon the virtual channel (VC) to which it belongs and hence the destination component to which the packet is to be delivered. Each destination component is assigned at least one, and at most two, VCs which are unique to it (one per direction). A destination component with two VCs assigned by definition receives traffic from both directions of the ring, whereas a destination component with one VC receives all traffic from a single ring direction.

Each trunk node comprise a routing table register, which maps destination components to virtual channels. When a packet is received at a trunk node from an attached source component, the trunk node examines a destination identifier in the header of the packet and uses this destination identifier to lookup the virtual channel associated with the identified destination component. The trunk node then assigns the packet to that virtual channel and forwards the packet along the interconnect in the direction associated with the virtual channel.

Figure 2:
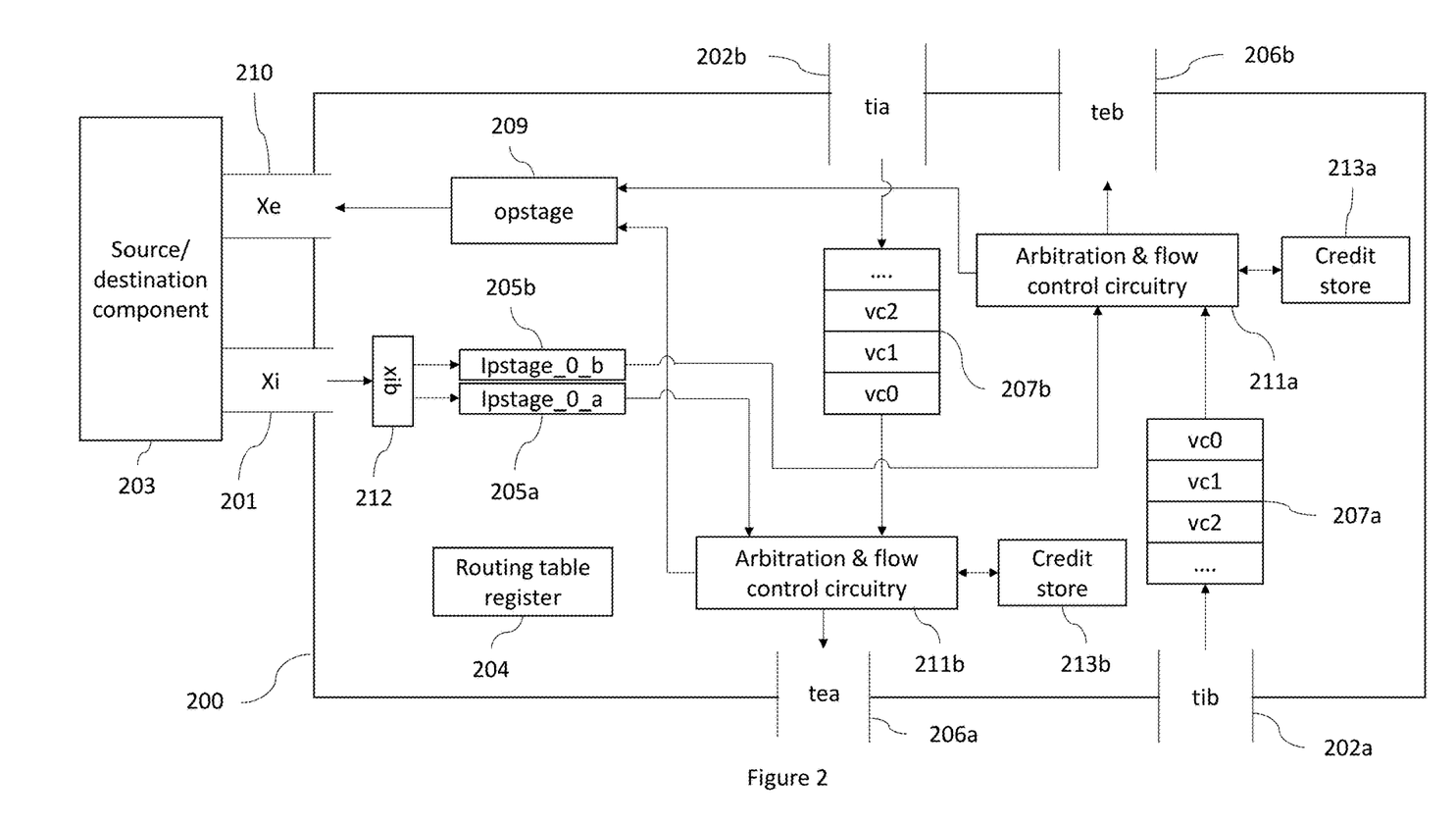
FIG. 2 is a schematic illustration of a node of the interconnect.

Reference is made to FIG. 2, which provides a schematic illustration of a trunk node 200 and a connected component 203. The component 203 may function as both a source component and a destination component. The trunk node 200 has an ingress interface 201 for receiving data from its attached component 203 and an egress interface 210 for outputting data to its attached component 203. The ingress interface 201 and egress interface 210 may be referred to as the exchange ingress port 201 and the exchange egress port 210, respectively. The trunk node 200 also includes interfaces for sending and receiving data with its neighbouring trunk nodes on the interconnect. Specifically, the trunk node 200 includes ingress interface 202a for receiving data from a further trunk node in a counter-clockwise direction, ingress interface 202b for receiving data from a further trunk node in a clockwise direction, egress interface 206a for sending data to a further trunk node in a clockwise direction, and egress interface 206b for sending data to a further trunk node in a counter-clockwise direction. The ingress interfaces 202a, 202b may be referred to as trunk ingress ports, whereas the egress interfaces 206a, 206b may referred to as trunk egress ports.

When a packet is received from the attached source component 203 over the ingress interface 201, ingress circuitry 212 of the node 200 determines the virtual channel to which the packet is to be assigned. This is achieved by using the destination identifier in the header of the packet to lookup a virtual channel identifier (vcid) and a direction of travel. If the packet is a read or write request targeting a memory location in one of the memory devices 120a-d, the destination identifier used to perform this lookup is a memory address, which identifies that memory location. In the case that the packet is targeting the memory of one of the tiles belonging to one of the processing units 2a-d, the destination identifier used to perform the lookup is an identifier of that tile and indicates the EPC to which the packet should be routed in order to be delivered to that tile. If the packet is to be routed over one of EPCs 150, 160 to a remote domain (comprising further fabric chips and processing units), the destination identifier used to perform the lookup may be a domain identifier identifying that remote domain to which the packet is to be routed.

The ingress circuitry 212 causes the packet to be stored in one of the ingress buffers 205a,b that is associated with the direction of travel determined based on the lookup. For example, if the ingress circuitry 212 determines from the routing table register 204 that the packet is to be routed in a clockwise direction, the packet is stored in ingress buffer 205a, whereas if the ingress circuitry 212 determines from the routing table register 204 that the packet is to be routed in a counter-clockwise direction, the packet is stored in the ingress buffer 205b. In either case, the packet is buffered along with the identifier (vcid) of the virtual channel to which the packet has been assigned. Although considered to be separate VCs, VCs in the CW and CCW rings may be similarly numbered. For example, in embodiments, there are 27 VCs numbered VC0 to VC26 in the CW direction, and additionally, 27 VCs numbered VC0 to VC26 in the CCW direction.

In addition to the ingress buffers 205a, 205b for receiving data from the attached source component 203, the trunk node 200 also comprises virtual channel buffers 207a, 207b, which store data received on the ingress ports 202a, 202b. Each of the virtual channel buffers 207a, 207b comprises a shared RAM, where different partitions of that shared RAM are used for storing data packets associated with different virtual channels. In each virtual channel buffer 207a, 207b, a plurality of read and write pointers are stored. Each of the read pointers for a virtual channel buffer 207a, 207b is associated with one of the virtual channels and indicates the location in the virtual channel buffer 207a, 207b of the next data packet belonging to that virtual channel to be sent from the trunk node 200. Each of the write pointers for a virtual channel buffer 207a, 207b is associated with one of the virtual channels and indicates the location in the virtual channel buffer 207a, 207b to which incoming data at the trunk node 200 for that virtual channel should be written to the buffer 207a, 207b.

The trunk node 200 comprises arbitration and flow control circuitry 211a, 211a. Circuitry 211a is configured to arbitrate between the different packets held in buffers 207a, 205b, and circuitry 211b is configured to arbitrate between the different packets held in buffers 207b, 205a. Each circuitry 211a, 211b arbitrates between different virtual channels (and hence destinations) and selects one of the virtual channels for the sending of data to the next trunk node 200. The circuitry 211b arbitrates between the clockwise virtual channels for sending data in the clockwise direction over egress interface 206a. The circuitry 211a arbitrates between the counter-clockwise virtual channels for sending data in the counter-clockwise direction over egress interface 206b. Each circuitry 211a, 211b arbitrates between its associated set of virtual channels by performing a round robin between the virtual channels.

Once a virtual channel is selected, the circuitry 211a causes the sending from the trunk node 200 of either the packet at the head of that VC's partition of the buffer 207a or the sending of the packet at the head of the exchange ingress buffer 205b. The circuitry 211a arbitrates between sending from VC buffer 207a or exchange ingress buffer 205b if the packet at the head of exchange ingress buffer 205b belongs to the selected VC. The arbitration between exchange ingress buffer 205b and VC buffer 207a is performed on the basis of the source (i.e. the source component that supplied them to the interconnect) from which the packets at the heads of those buffers originated. This arbitration between sources is described in more detail in our earlier patent application U.S. Ser. No. 17/658,955, which is incorporated by reference. As the circuitry 211a arbitrates between sending data from VC buffer 207a and exchange ingress buffer 205b, so circuitry 211b may arbitrate between sending data from VC buffer 207b and exchange ingress buffer 205a.

Once a packet has been selected for sending from the trunk node 200, the circuitry 211a, 211b may send the packet over the relevant egress interface 206a, 206b or to exchange egress buffer 209 for dispatch over exchange egress port 210 to the destination component 203. The circuitry 211a, 211b causes packets to be sent via exchange egress port 210 for delivery to destination component 203 if the vcid for those packets identifies the virtual channel associated with the destination component 203. Packets associated with a different virtual channel are sent over the relevant egress interface 206a, 206b.

Each circuitry 211a, 211b has an associated credit store 213a, 213b for storing credits associated with virtual channels. Each of the credits indicates the number of free spaces available for that associated virtual channel in the corresponding virtual channel buffer in the downstream trunk node. When arbitrating between the virtual channels, each circuitry 211a, 211b will only select a particular virtual channel for sending data over an egress interface 206a, 206b in the case that there are a non-zero number of credits associated with that virtual channel in the relevant credit store 213a, 213b. Upon sending (over one of egress interfaces 206a, 206b) a data packet associated with the virtual channel to another trunk node of the interconnect, the relevant circuitry 211a, 211b decrements the number of credits associated with the virtual channel in the credit store 213a, 213b that holds the credits for that virtual channel. Upon sending a packet from its virtual buffer 207a, 207b, the circuitry 211a, 211b transmits a credit notification to an upstream trunk node to cause the credit count associated with the virtual channel and held by that upstream trunk node to be incremented by one.

As discussed above, the interconnect may, in addition to the trunk nodes, also include trunk extension units (TEUs), which do not have an associated source/destination component. The trunk extension units also include the components (i.e. VC buffers 207a, 207b, arbitration & flow control circuitry 211a, 211b, and credit store 213a, 213b) used for exchanging data packets with other nodes of the interconnect, but omit the components (i.e. exchange ingress buffers 205a, 205b, exchange egress buffers 209, exchange ingress port 201, exchange egress port 210) for exchanging packets with an attached source/destination component.

Figure 3A:
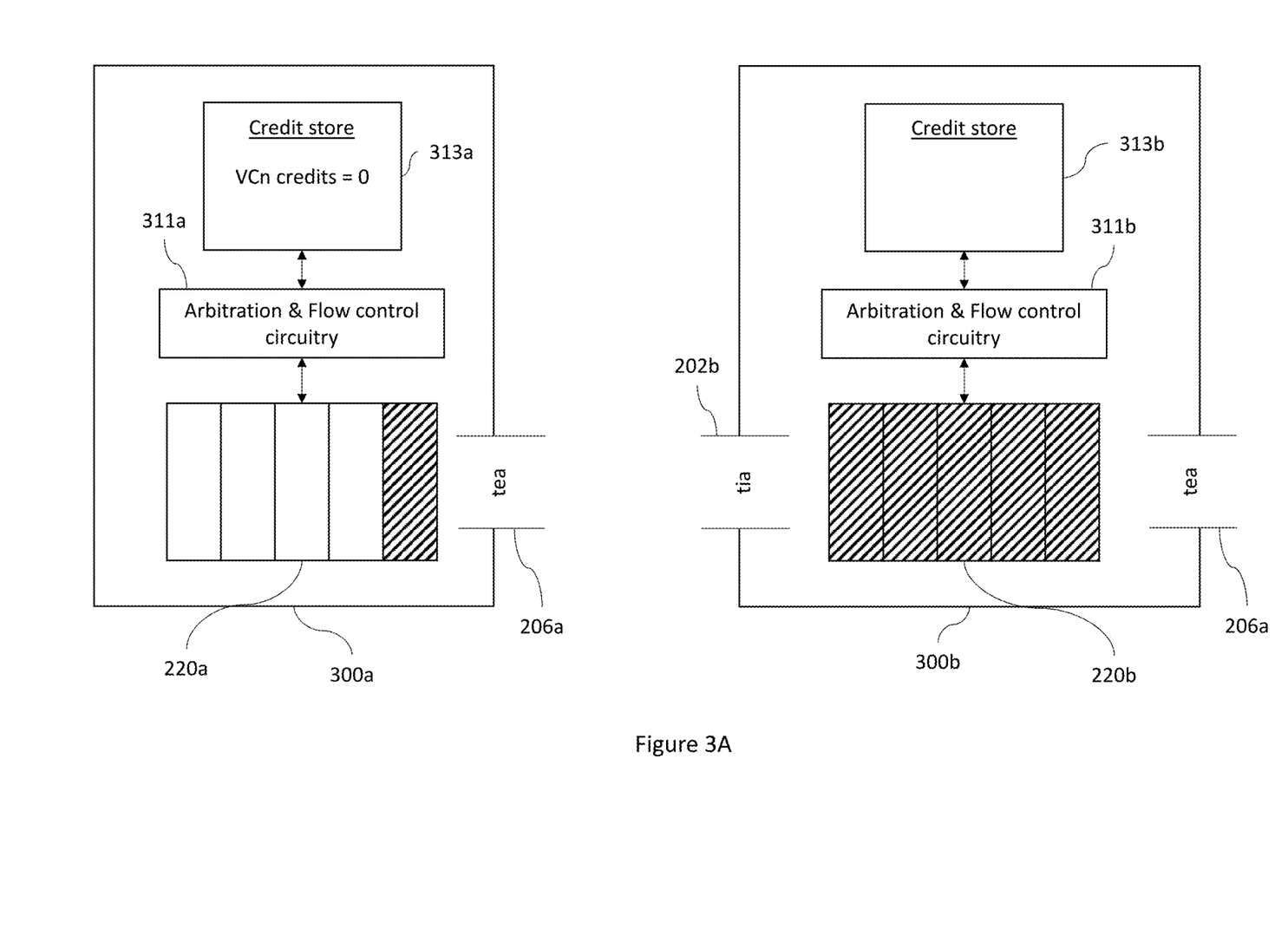
FIG. 3A illustrates two nodes of the interconnect, where a partition of the downstream node has no available space for storing packets from the upstream node.

Reference is made to FIG. 3A, which illustrates how credits may be used to control the transmission of a data packet from an upstream node 300a to a downstream node 300b. Each of the nodes 300a, 300b shown may be an instance of the trunk node 200 shown in FIG. 2 or may be a trunk extension unit. In each of the nodes 300a, 300b is shown a partition 220a, 220b of a virtual channel buffer 207b. The partitions 220a, 220b are associated with a same one of the virtual channels (referred to as "VCn" in this example), and are used for storing data associated with that virtual channel. Each partition 220a, 220b has a number of spaces for storing packets. The hatching indicates which of the spaces are currently occupied by a packet. As shown, partition 220a contains one data packet, which is pending transmission to the downstream node 300b along the interconnect. Partition 220b is full of data packets pending transmission, such that there is no available space for storing a further data packet, such as the data packet held in partition 220a that is pending transmission to node 300b.

Each node 300a, 300b is shown as including a credit store 313a, 313b and arbitration & flow control circuitry 311a, 311b. Each of the credit stores 313a, 313b is a different instance of credit store 213b discussed above. Each set of circuitry 311a, 311b is a different instance of circuitry 211b discussed above.

The credit store 313a of node 300a stores the number of credits associated with VCn, where this number of credits indicate the number of available spaces in partition 220b for storing further data packets. In the example, since there are zero available spaces in partition 220b, the number of credits associated with VCn is shown as being zero. Although the number of credits held in credit store 313b and associated with VCn is not shown, credit store 313b would also store a number of credits indicating the amount of available space in a further node (which is downstream from node 300b) for receiving and storing packets associated with VCn.

Figure 3B:
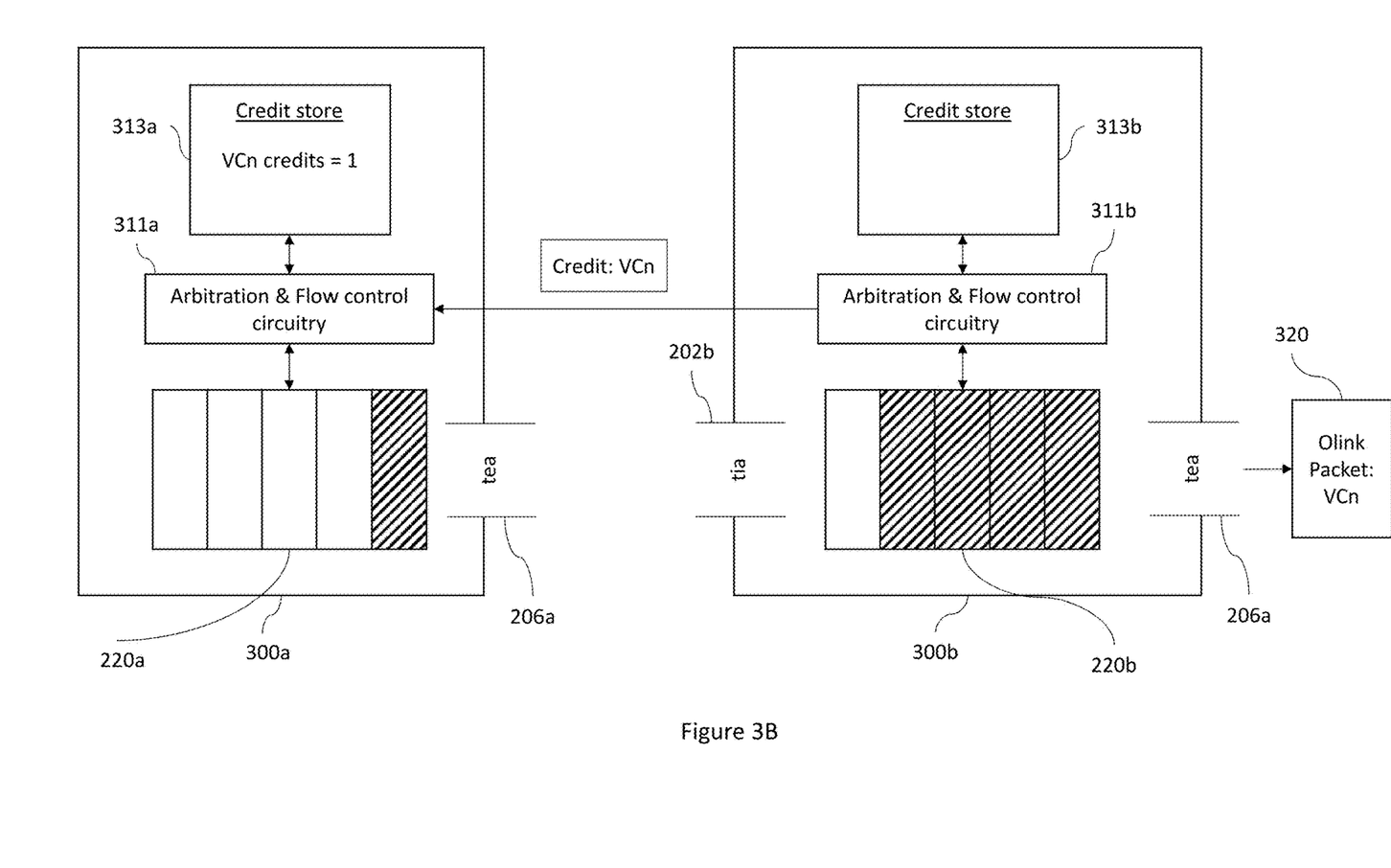
FIG. 3B illustrates the two nodes of the interconnect, where a space has become available in the partition of the downstream node and a credit is sent upstream.

Reference is made to FIG. 3B, which illustrates how the credits held in credit store 313a are incremented when a packet 320 is transmitted from node 300b. The circuitry 311b causes the packet 320, which is associated with VCn, to be transmitted from the partition 220b of a virtual channel buffer 207b to a node (not shown) which is downstream of node 300b. As a result of this transmission, space is then made available in partition 220b for storage of a further packet. The circuitry 311b causes a message (shown as "Credit: VCn") to be sent to node to 300a, indicating that the number of credits associated with VCn should be incremented by one, since an additional space has become available in partition 220b. In response to this message, the circuitry 311a of node 300a increments the number of credits in credit store 313a. In the example, the number of credits associated with VCn is then equal to 1.

Figure 3C:
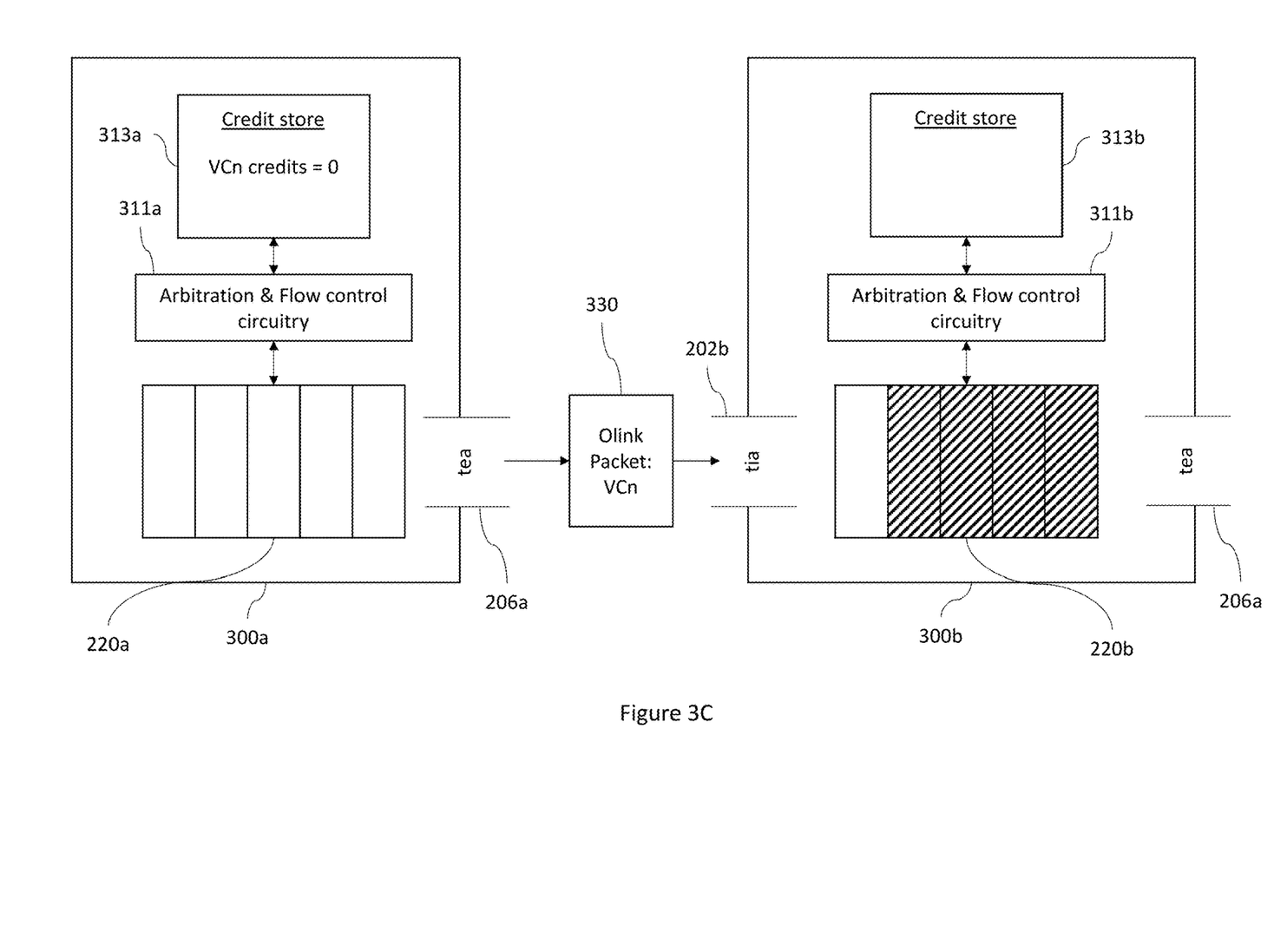
FIG. 3C illustrates the two nodes of the interconnect, where in response to the credit being sent upstream, the upstream node sends a packet to the downstream node.

Reference is made to FIG. 3C, which illustrates how, in response to the credits associated with VCn being set to a non-zero value, a packet 330 is transmitted by node 300a to node 300b. In response to detecting that the number of credits associated with VCn is non-zero, the circuitry 311a causes packet 330 to be transmitted to node 300b. Upon arrival at node 300b, this packet is stored in partition 220b. As a result of the transmission of the packet from the upstream node 300a to the downstream node 300b, there will be one less available free space in the partition 220b. Therefore, the circuitry 311a decrements the number of credits associated with VCn held in the credit store 313a.

According to embodiments, nodes (trunk nodes and trunk extension units) of the interconnect each comprise wiring providing a bypass path that bypasses the buffer. The bypass path which is made use of when conditions in relation to each of the virtual channels used for transmitting data packets in a given direction around the interconnect are met, such that there are no packets that may be sent from the VC buffer. The conditions are that for each of the virtual channels, there are either zero credits associated with that virtual channel in the credit store or there are no other data packets associated with that virtual channel pending transmission from the node. The bypass path provides a reduction in the number of clock cycles required for a data packet to pass through a node on the interconnect, since it is not necessary to perform the writing of the data packet to the VC buffer, and the reading of that data packet from the VC buffer.

Figure 4:
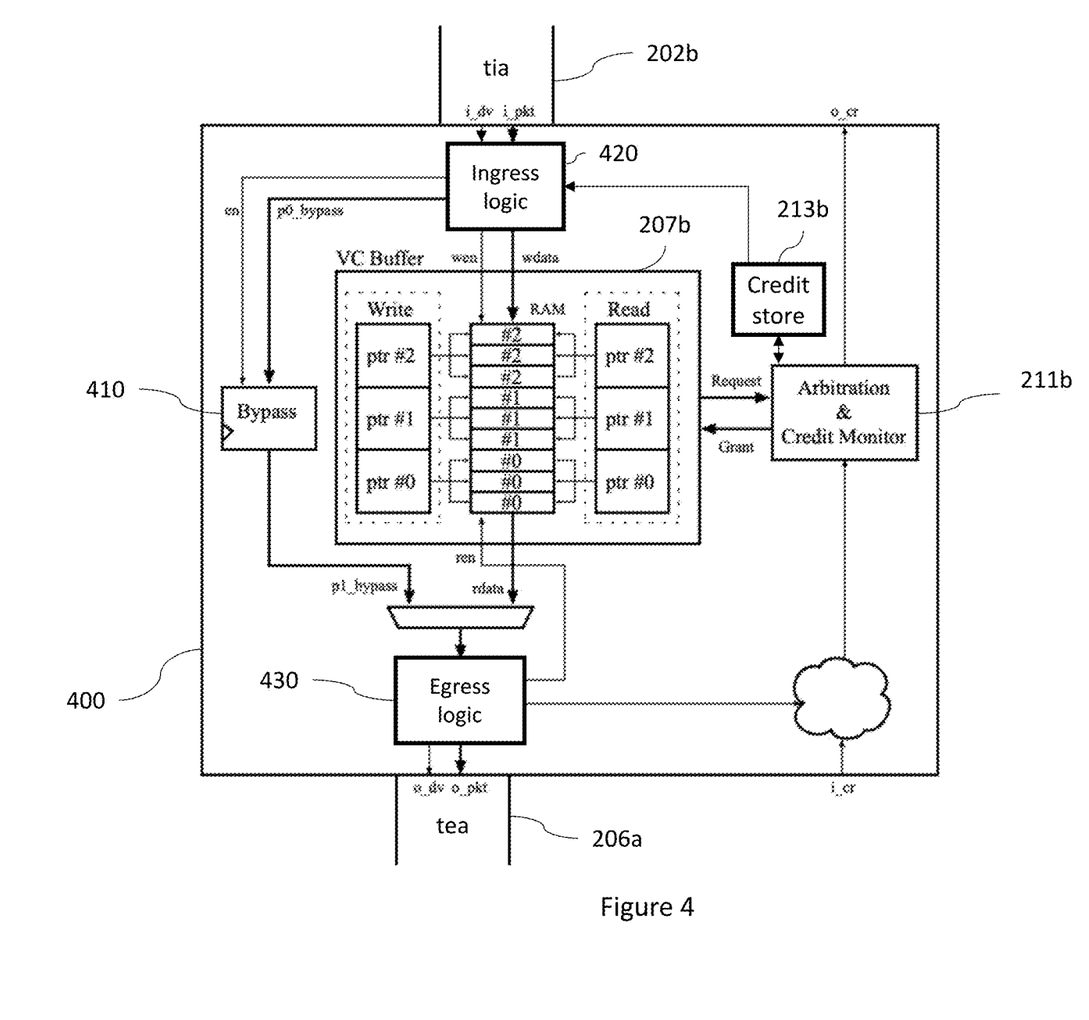
FIG. 4 is a further schematic illustration of a node of the interconnect, showing the bypass path as an alternative to the path through the VC buffer.

Reference is made to FIG. 4, which shows a further schematic of the node 400 (which may be a trunk node or a trunk extension unit) showing the bypass path. The node 400 (which may be referred to as a first node of the interconnect) receives data packets over its ingress interface 202b from an upstream node (which may be referred to as a second node of the interconnect) and sends those data packets via the egress interface 206a to a downstream node (which may be referred to as third node of the interconnect). The second and third nodes may be trunk nodes 200 or trunk extension units. A subset of the packets received on interface 202b are stored in the buffer 207b, prior to being forwarded over egress interface 206a. However, some of the packets are instead sent via the bypass path.

The node 400 is shown as comprising a set of flip flops 410, referred to as the bypass flip flops 410, which are part of the wiring providing the bypass path. Also shown in FIG. 4 is the VC buffer 207b, storing the write pointers and read pointers, in addition to the shared RAM in which the data packets are buffered whilst traversing the interconnect. In this schematic, the shared RAM is shown divided into three different partitions, each of which is used for storing packets belonging to a different VC. The partitions are labelled #0, #1, and #2. In this example, each of the partitions is shown as comprising three different spaces, each of which is able to store one packet. The virtual channel buffer 207b also comprises a set of write pointers, and a set of read pointers, each of which is associated with one of the virtual channels and hence one of the partitions of the RAM. Each of the write pointers indicates the next available space into which an incoming packet received at the node 211b on ingress interface 202b and associated with its virtual channel, is to be written to the RAM. Each of the read pointers indicates the location in the RAM from which the next data packet associated with its virtual channel is to be read from the RAM. It would be appreciated that, although FIG. 4 shows the partitions, write pointers and read pointers for three different virtual channels, the VC buffer 207b would typically include partitions and pointers for more than three virtual channels e.g. for 27 virtual channels.

A packet is received at the node 400 when an input data valid signal (shown as i_dv) is held high, and the packet itself (shown as i_pkt) is received. The packet is transmitted between each node in parallel, such than only a single clock cycle is required to transmit the entire packet from one node to another node. As a result, the i_dv signal is held high for one clock cycle whilst the packet is received. Ingress logic 420 applies the conditions associated with the virtual channels to determine whether the received packet should be sent via the bypass path or should be stored in the virtual buffer 207b.

To determine whether to send the packet by the bypass path, the logic 420 determines whether, for each of the virtual channels for which packets are received over interface 202b, there is either no data held in the VC buffer 207b awaiting transmission or there is a zero number of credits in the credit store 213b. If, for each channel, at least one of these conditions is met, then there is no data currently held in the VC buffer that may be sent to the downstream node, and therefore the received packet may proceed via the bypass path without taking priority ahead of other traffic that could be sent from the VC buffer 207b.

Additionally, as part of determining whether to send the packet by the bypass path, the logic 420 determines whether the number of credits associated with that packet's virtual channel and held in credit store 213b is non-zero. When the packet is received at the node 400, the logic 420 determines the virtual channel to which that packet belongs by examining the vcid that is received with the packet. If the number of credits associated with this VC is non-zero, this indicates that VC buffer space is available in the downstream node 400 for receiving and storing the packet. If the credits associated with the VC of the packet are non-zero and the other conditions (i.e. all VCs in the given direction either have zero credits or an empty partition in buffer 207b) are met, the logic 420 causes the packet to be sent via the bypass path without being stored in the VC buffer 207b. If there are zero credits associated with the packet's VC, there is no buffer space in the downstream node for storing the packet. Therefore, in that case, the packet is stored in VC buffer 207b until such space becomes available.

Given that, for the virtual channel associated with the received packet, a condition to be met is that the credits are non-zero, as a consequence of the condition that all VCs must either have zero credits or an empty partition (i.e. no packets pending transmission), the partition of the VC buffer for the virtual channel of the received packet must be empty. The ingress logic 420 enforces this condition and only forwards a received packet via the bypass path if the partition of the VC buffer for the VC of the received packet is empty.

Figure 5:
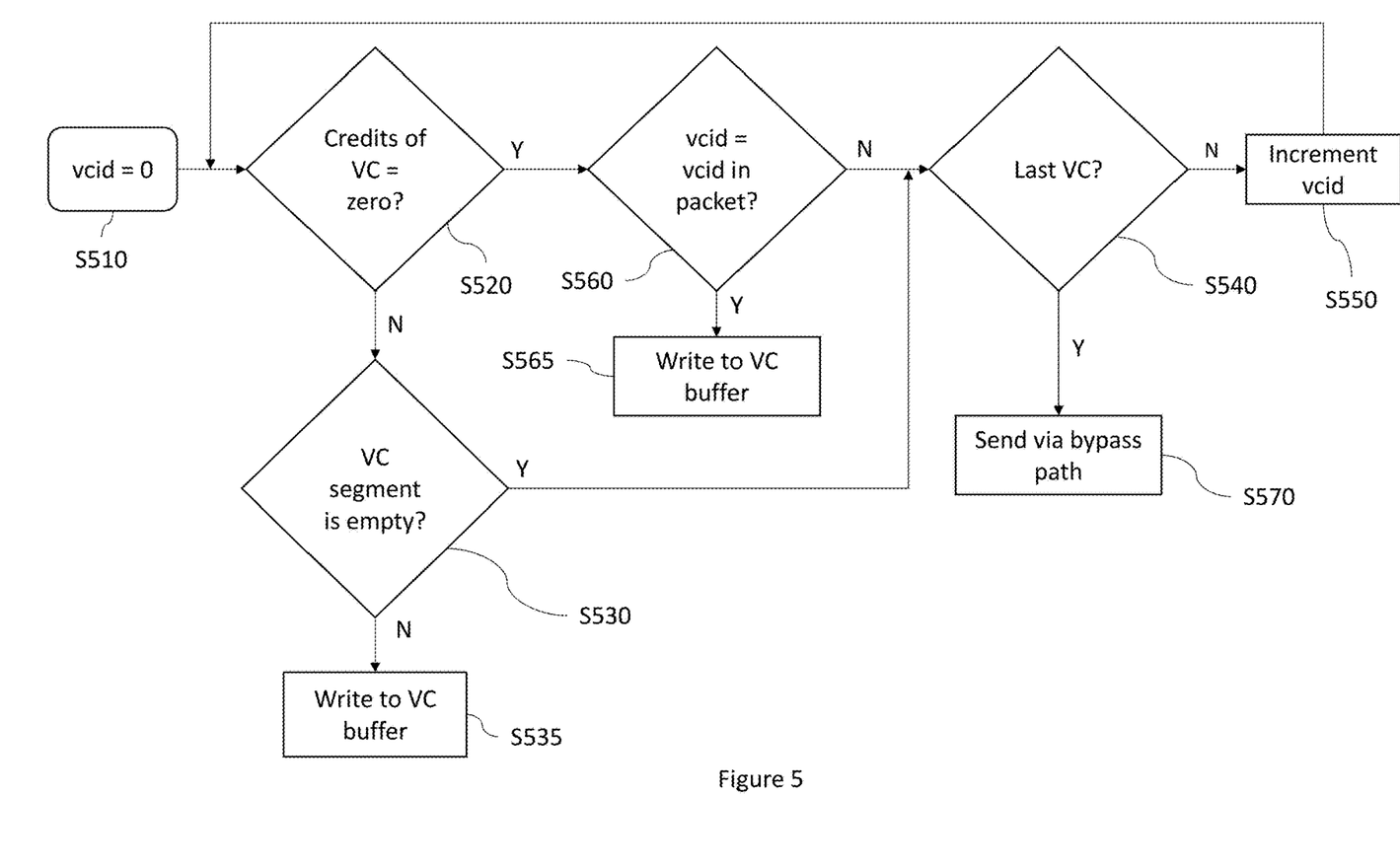
FIG. 5 shows a logical flow chart, indicating how the decision to forward a packet via the VC buffer or the bypass path is made.

Reference is made to FIG. 5, which shows a logical flow diagram illustrating how the ingress logic 420 may determine whether a particular packet received on the ingress port 202b of the node 400 should be sent via the bypass path or should be stored in the VC buffer. This decision is made by considering in turn whether the relevant conditions are met for each of the VCs used for transmission in a given direction around the interconnect. In this example, a vcid value is incremented such that each VC is considered in turn. It would be appreciated that, although the logic 420, in determining whether to send a packet via the bypass path or the VC buffer 207b, evaluates whether the conditions set out in the diagram are met, the order of the steps may differ from that presented.

At S510, the vcid value, which identifies the VC being considered, is set to zero. At S520, the logic 420 determines whether the number of credits associated with that VC and held in the credit store 213b is equal to zero. If not, at S530, the logic 420 determines whether the partition associated with that VC in the buffer 207b is empty (i.e. contains no packets pending transmission to the downstream node). If not, at S535, the logic 420 causes the packet to be written to the VC buffer 207b, since at least one of the conditions of S520 and S530 must be met for all VCs for the bypass path to be made use of.

If, at S530, the logic 420 determines that the partition associated with the VC under consideration is empty, the logic 420, at S540, determines whether the VC is the last VC to be considered. If not, at S550, the logic 420 increments the vcid identifying the VC under consideration and determines whether the next VC meets at least one of conditions S520 and S530.

If, at S520, the logic 420 determines that the number of credits associated with the VC under consideration is zero, the logic 420, at S560, determines whether the vcid identifying the VC under consideration matches the vcid received with the packet. If so, the logic 420, at S565, causes the packet to be written to the VC buffer, since there are no credits available for sending that packet immediately via the bypass path. If the vcids do not match, then the logic 420 proceeds to, at S540, check whether all of the VCs have been considered.

If it is determined that the conditions have been met for all VCs, then the logic 420 causes, at S570, the packet to be sent via the bypass path.

Referring back to FIG. 4, if the logic 420 determines to send the received packet by the bypass path, the logic 420 causes an enable signal (shown as "en") to be asserted high to enable a write to the bypass flop bank 410. The logic 420 causes the writing of the data (shown as "p0_bypass") to the bypass flop bank 410 to be performed in a single clock cycle. In the immediately following clock cycle, an output data valid signal (shown as "o_dv") is raised high and the data (shown as "p1_bypass" and "o_pkt") is transferred from the flop bank 410 and sent via the egress interface 206a.

If the logic 420 determines that the packet is not to be sent by the bypass path, the logic 420 causes the packet to be written to the VC buffer 207b at the location identified by the write pointer for the VC of the packet. The logic 420 causes a write enable signal (shown as "wen") to be asserted to enable a write to the VC buffer 207b, and causes the data to be written (shown as "wdata") in a single clock cycle. In a subsequent clock cycle (which may immediately follow or be a number of clock cycles ahead), the egress logic 430 asserts a read enable signal (shown as "ren"), which causes the data packet (shown as "rdata") to be read out of the VC buffer 207b. The output data valid signal (o_dv) signal is then asserted and the data packet (o_pkt) is transferred over the interface 206a in a further clock cycle.

In either case, whether the data packet is sent via the bypass path or the VC buffer 207b, the egress logic 430 receives the vcid of the packet and causes the number of credits in the credit store 213b associated with the virtual channel identified by that vcid to be decremented by one.

Figure 6A:
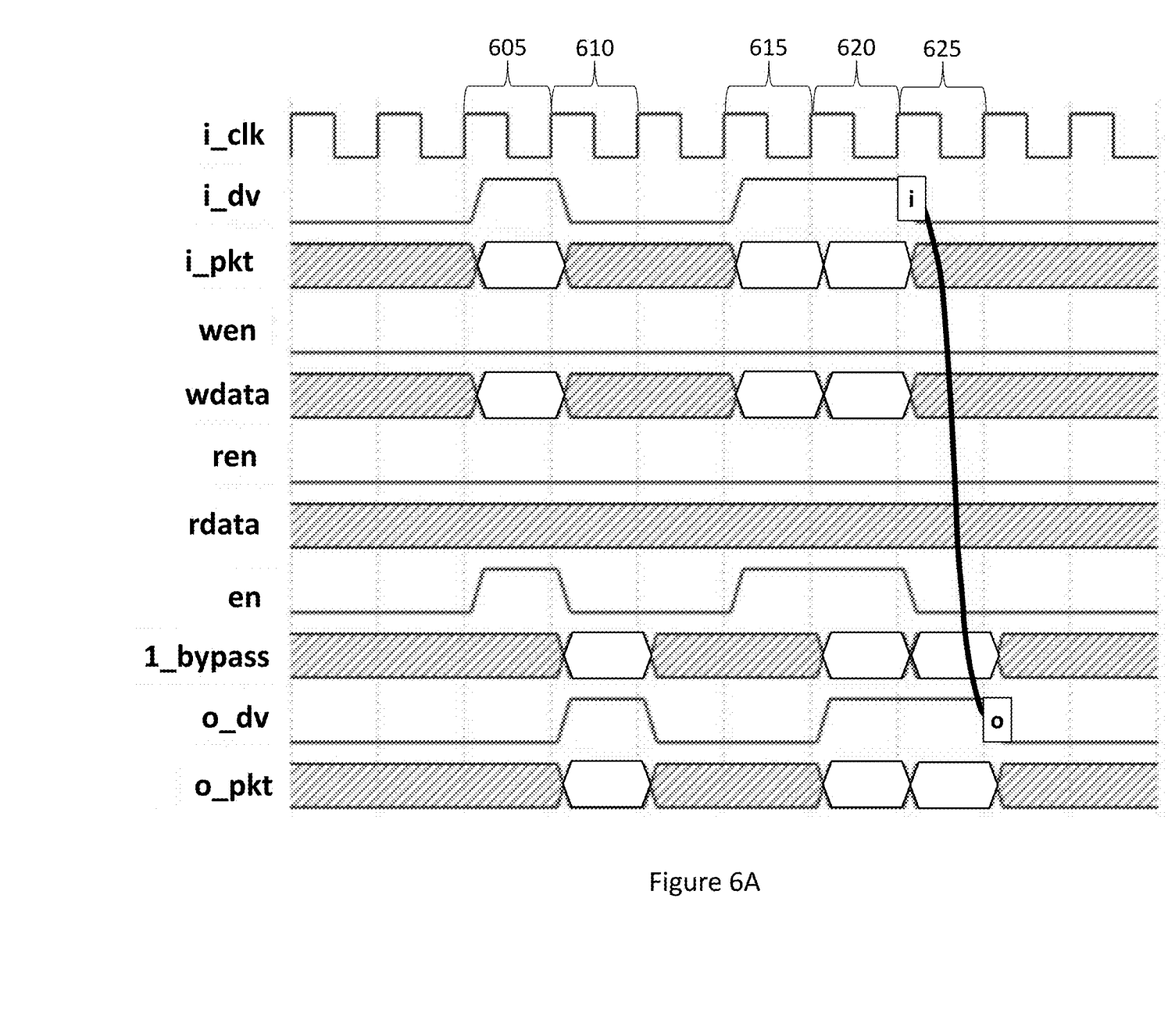
FIG. 6A illustrates the waveforms of the signals asserted in the trunk node for causing data packets to be transferred through the trunk node via the bypass path.
Figure 6B:
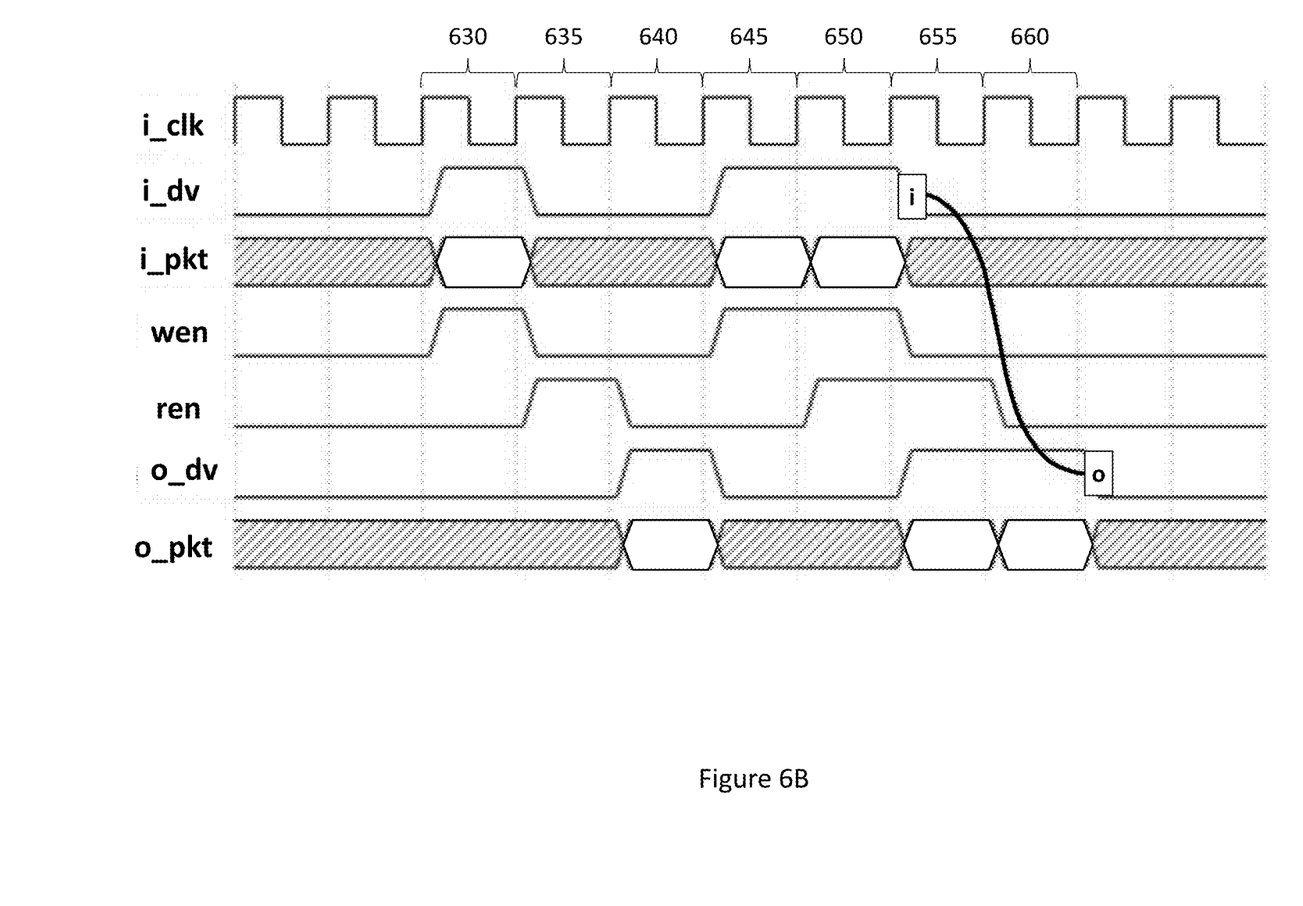
FIG. 6B illustrates the waveforms of the signals asserted in the trunk node for causing data packets to be transferred through the trunk node via the VC buffer.

Use of the bypass path may reduce the latency associated with a node 400 on the interconnect by one clock cycle. Reference is made to FIGS. 6A and 6B, which illustrate the different signals that are asserted when packets are sent via the bypass path or the VC buffer 207b. FIG. 6A illustrates the case where three different packets are sent via the bypass path, and FIG. 6B illustrates the case where three packets are sent via the VC buffer 207b. Each of the signals shown are asserted by circuitry of the node 400 to cause packets to be transferred from the ingress interface 202b to the egress interface 206a. The clock signal is a clock signal used for clocking various components of the fabric chip 110, including the node 400.

As shown in FIG. 6A, during clock cycle 605, the enable signal (en) is asserted to cause a first data packet to be stored in the bypass flip flops 410. During clock cycle 610, the output data valid signal (o_dv) is asserted to cause the first data packet to be output via the egress interface 206a. Therefore, only two clock cycles are required to transfer the first packet through the node 400 when that packet is sent via the bypass path. Similarly, two cycles 615, 620 are used for transferring a second packet via the bypass path and two cycles 620, 625 are used for transferring a third packet via the bypass path.

In FIG. 6B, during clock cycle 630, the write enable signal (wen) is asserted to cause a fourth data packet to be written to the buffer 207b. During clock cycle 635, the read enable signal (ren) is asserted to cause the fourth data packet to be read from the buffer 207b. During clock cycle 640, the output data valid signal (o_dv) is asserted to cause the fourth data packet to be output over the egress interface 206a. Therefore, three clock cycles are required to transfer the fourth packet through the node 400 when that packet is written to the VC buffer 207b. Similarly, three cycles 645, 650, 655 are used for transferring a fifth packet and three cycles 650, 655, 660 are used for transferring a sixth packet.

Figure 7:
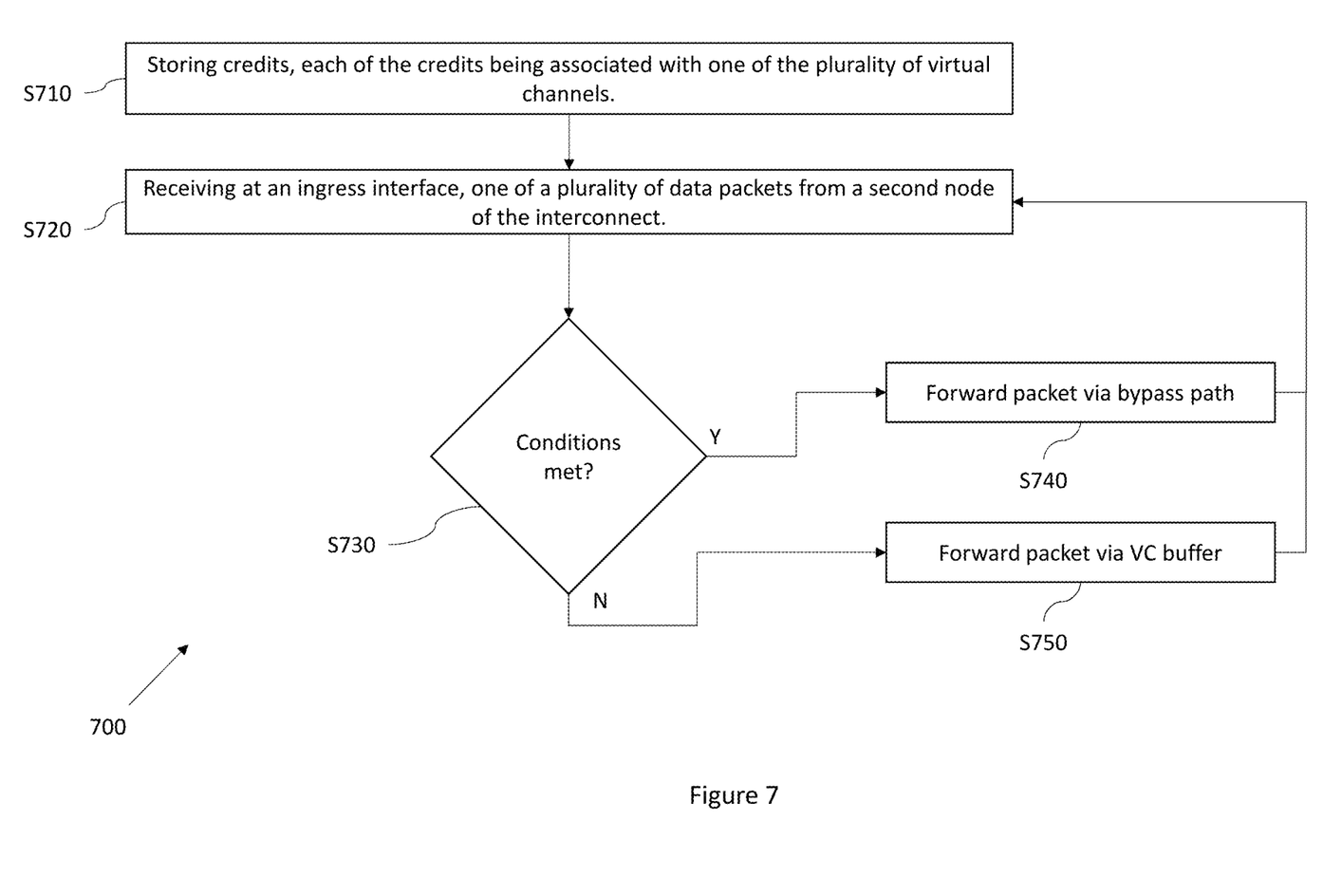
FIG. 7 illustrates an example of a method according to embodiments.

Reference is made to FIG. 7, which illustrates an example method 700 according to embodiments. At S710, a set of credits are stored in the credit store 213b. Each of these credits is associated with one of a plurality of virtual channels and provides permission for the sending of a single data packet over egress interface 206a.

At S720, one of a plurality of data packets is received at the ingress interface 202b from the second node of the interconnect.

At S730, it is determined whether, for each of the virtual channel, at least one the conditions are met for forwarding the packet received at S720 via the bypass path. These conditions are that i) there are zero credits in the credit store 213b for the respective virtual channel and that ii) there are zero packets in the buffer 207b that belong to the respective virtual channel and that are pending transmission to the third node of the interconnect. In response to determining that at least one of these conditions are met for each virtual channel, at S740, the packet is sent via the bypass path to be forwarded over the egress interface 206a. If, however, neither of the conditions are met for one or more of the virtual channels, the packet is stored in the VC buffer 207b to be forwarded over the egress interface 206a one or more clock cycles later.

After performing either S740 or S750, the method 700 proceeds again to S720, at which point another packet is received at the ingress interface 202b. S730 and either S740 or S750 are repeated for this packet, and are repeated each time a new packet is received at ingress interface 202b.

It will be appreciated that the above embodiments have been described by way of example only. In the above described examples, various actions are described as being performed by circuitry (e.g. exchange ingress circuitry 212, arbitration & flow control circuitry 211b, ingress logic 420, and egress logic 430) of nodes 200, 300, 400. Although shown in some Figures as physically separate blocks, the circuitry may be provided in unified blocks of circuitry. The circuitry may comprise dedicated circuitry for performing at least some of the described operations in hardware and/or may comprise one or more processors for executing instructions of a computer program to perform at least some of the described operations.

The invention claimed is:

1. A first node of an interconnect, wherein the first node comprises:
    an ingress interface configured to receive a plurality of data packets from a second node of the interconnect, wherein each of the plurality of data packets is associated with one of a plurality of virtual channels;
    a buffer configured to store a subset of the plurality of data packets;
    wiring providing a path from the ingress interface to the egress interface, wherein the path bypasses the buffer;
    an egress interface configured to output the plurality of data packets to a third node of the interconnect;
    a credit store configured to store credits, each of the credits being associated with one of the plurality of virtual channels and granting permission for sending to the third node, one of the plurality of data packets that is associated with the respective one of the plurality of virtual channels; and circuitry configured to:

forward the subset of the plurality of data packets from the buffer over the egress interface for delivery to the third node;

upon receipt of a first packet of the plurality of data packets, forward the first packet via the path for output over the egress interface in response to determining that for each of the virtual channels, at least one of the following conditions is met:

there are zero credits associated with the respective virtual channel in the credit store; and there are no data packets associated with the respective virtual channel that are held in the buffer and pending transmission to the third node.

2. The first node of claim 1, wherein the first packet is associated with a first of the virtual channels, wherein the circuitry is configured to forward the first packet via the path in response to determining that:

there is a non-zero number of credits associated with the first of the virtual channels in the credit store; and there are no data packets associated with the first of the virtual channels held in the buffer and pending transmission to the third node.

3. The first node of claim 2, wherein the ingress interface is configured to receive with the first packet, an identifier of the first of the virtual channels, wherein the circuitry is configured to check that there is a non-zero number of credits associated with the first of the virtual channels in response to receipt of the identifier of the first of the virtual channels.

4. The first node of claim 1, wherein the circuitry is configured to, in response to forwarding each of the data packets to the third node:

decrement a number of the credits associated with one of the virtual channels that is associated with the respective data packet.

5. The first node of claim 1, wherein the circuitry is configured to forward the first packet via the path for output over the egress interface by:

storing the first packet to a bank of flip flops; and subsequently, outputting the first packet from the bank of flip flops over the egress interface.

6. The first node of claim 5, wherein the circuitry is configured to:

perform the storing the first packet to the bank of flip flops in a first clock cycle of a clock signal for the first node; and perform the outputting of the first packet over the egress interface in a second clock cycle of the clock signal.

7. The first node of claim 1, wherein the circuitry is configured to:

write a second packet to the buffer;

read the second packet from the buffer; and output the second packet over the egress interface, wherein the second packet belongs to the subset of the plurality of data packets.

8. The first node of claim 7, wherein the circuitry is configured to:

perform the writing of the second packet to the buffer in a first clock cycle of a clock signal for the first node;

perform the reading of the second packet from the buffer in a second clock cycle of the clock signal; and perform the outputting of the second packet over the egress interface in a third clock cycle of the clock signal.

9. The first node of claim 1, wherein the circuitry is configured to, for each of the virtual channels:

in response to receipt at the first node from the third node, of a notification identifying the respective virtual channel, increment a number of the credits associated with the respective virtual channel held in the credit store.

10. The first node of claim 1, wherein the egress interface is configured to, for each of the plurality of data packets:

output all bits of the respective data packet in parallel in a single clock cycle.

11. The first node of claim 1, wherein for each of the virtual channels:

ones of the packets associated with the respective virtual channel each comprise a destination identifier identifying a component associated with the respective virtual channel that is accessible via the interconnect.

12. The first node of claim 11, wherein the first node comprises a register mapping identifiers of the components to the virtual channels, wherein the circuitry is configured to:

in response to receipt of a third packet from a first of the components, look up a virtual channel identifier from the register based on a destination identifier in the third packet; and assign the third packet to one of the virtual channels identified by the virtual channel identifier.

13. The first node of claim 1, wherein the circuitry is configured to:

arbitrate between the virtual channels to select between the packets held in the buffer to send over the egress interface.

14. A device comprising:

an interconnect, the interconnect comprising at least a first node, second node and third node, the first node comprising:

an ingress interface configured to receive a plurality of data packets from the second node of the interconnect, wherein each of the plurality of data packets is associated with one of a plurality of virtual channels;

a buffer configured to store a subset of the plurality of data packets;

wiring providing a path from the ingress interface to the egress interface, wherein the path bypasses the buffer;

an egress interface configured to output the plurality of data packets to the third node of the interconnect;

a credit store configured to store credits, each of the credits being associated with one of the plurality of virtual channels and granting permission for sending to the third node, one of the plurality of data packets that is associated with the respective one of the plurality of virtual channels; and circuitry configured to:

forward the subset of the plurality of data packets from the buffer over the egress interface for delivery to the third node;

upon receipt of a first packet of the plurality of data packets, forward the first packet via the path for output over the egress interface in response to determining that for each of the virtual channels, at least one of the following conditions is met:

there are zero credits associated with the respective virtual channel in the credit store; and there are no data packets associated with the respective virtual channel that are held in the buffer and pending transmission to the third node.

15. The device of claim 14, wherein the device is an integrated circuit, and the interconnect is a network on chip.

16. The device of claim 14, wherein the interconnect forms a ring path on the device.

17. The device of claim 14, wherein the third node comprises a further buffer and further circuitry, the further circuitry configured to:
   cause ones of the data packets to be transmitted to a fourth node of the interconnect; and
   for each of the ones of the data packet transmitted to the fourth node, dispatch to the first node, a notification that credits for one of the virtual channels associated with the respective data packet are to be incremented.

18. A method implemented in a first node of an interconnect, wherein the method comprises:
   storing credits in a credit store, each of the credits being associated with one of a plurality of virtual channels and granting permission for sending to a third node of the interconnect, one of a plurality of data packets that is associated with the respective one of the plurality of virtual channels;
   receiving at an ingress interface, the plurality of data packets from a second node of the interconnect, wherein each of the plurality of data packets is associated with one of the plurality of virtual channels;
   storing a subset of the plurality of data packets in a buffer;
   forwarding the subset of the plurality of data packets from the buffer over an egress interface of the first node for delivery to the third node;
   upon receipt of a first packet of the plurality of data packets, forwarding the first packet via a path that bypasses the buffer for output over the egress interface in response to determining that for each of the virtual channels, at least one of the following conditions is met:
      there are zero credits associated with the respective virtual channel in the credit store; and
      there are no data packets associated with the respective virtual channel that are held in the buffer and pending transmission to the third node.

19. A non-transitory computer readable medium storing a computer program comprising a set of computer readable instructions which, when executed by at least one processor of a first node of an interconnect, cause a method to be performed, wherein the method comprises:
   storing credits in a credit store, each of the credits being associated with one of a plurality of virtual channels and granting permission for sending to a third node of the interconnect, one of a plurality of data packets that is associated with the respective one of the plurality of virtual channels;
   storing a subset of the plurality of data packets in a buffer;
   forwarding the subset of the plurality of data packets from the buffer over an egress interface of the first node for delivery to the third node; and
   upon receipt of a first packet of the plurality of data packets at the first node, forwarding the first packet via a path that bypasses the buffer for output over the egress interface in response to determining that for each of the virtual channels, at least one of the following conditions is met:
      there are zero credits associated with the respective virtual channel in the credit store; and
      there are no data packets associated with the respective virtual channel that are held in the buffer and pending transmission to the third node.

* * * * *